United States Patent

[11] 3,566,118

| [72] | Inventor | Charles W. Peters<br>Alexandria, Va. |
|---|---|---|
| [21] | Appl. No. | 775,837 |
| [22] | Filed | Nov. 14, 1968 |
| [45] | Patented | Feb. 23, 1971 |
| [73] | Assignee | The United States of America as represented by the Secretary of the Navy |

[54] AN AXIALLY ALIGNED GAMMA RAY-NEUTRON DETECTOR
4 Claims, 1 Drawing Fig.

| [52] | U.S. Cl. | 250/83.1, 250/71.5 |
|---|---|---|
| [51] | Int. Cl. | G01t 1/20, G01t 3/00 |
| [50] | Field of Search | 250/83.1, 71.5; 313/61 |

[56] References Cited
UNITED STATES PATENTS

| 3,141,092 | 7/1964 | Weinberg | 250/83.1 |
| 3,246,151 | 4/1966 | Tanaka et al. | 250/71.5 |
| 3,247,377 | 4/1966 | Hall, Jr. | 250/83.1 |

Primary Examiner—James W. Lawrence
Assistant Examiner—Morton J. Frome
Attorneys—R. S. Sciascia, A. L. Branning and M. L. Crane ABSTRACT: A neutron and gamma ray detector including in combination one detector that detects gamma rays and another detector that detects neutrons in the presence of a large flux of gamma rays. The two detectors are combined in such a manner that the scintillator material of the gamma detector becomes the moderator material of the neutron detector.

PATENTED FEB 23 1971
3,566,118
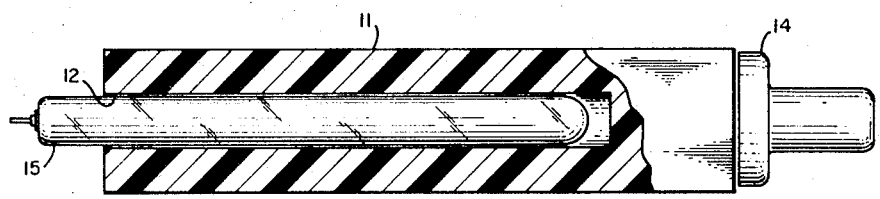
INVENTOR
CHARLES W. PETERS
BY Melvin L. Crane AGENT
ATTORNEY

AN AXIALLY ALIGNED GAMMA RAY-NEUTRON DETECTOR

The invention described herein may be manufactured and used by or for the Government of the United States of America for governmental purposes without the payment of any royalties thereon or therefor.

BACKGROUND OF THE INVENTION

Heretofore gamma rays and/or neutrons have been detected by an organic or plastic scintillation detector, which produces flashes of light in the scintillator as they lose their energy through nuclear reactions in the scintillator. The light flashes due to gamma rays can be distinguished from those due to neutrons by the shape of the output in certain organic scintillators, consequently the detector can detect either gamma rays or neutrons or both. However, it is very difficult to detect neutrons in the presence of a large flux of gamma rays. Other types of instrumentation have been used for detecting neutrons only, such as disclosed in U.S. Pat. No. 3,141,092.

SUMMARY OF THE INVENTION

This invention is directed to a system for detecting neutrons in the presence of a large flux of gamma rays as well as simultaneously detecting the gamma rays. The system makes use of a suitable neutron counter such as a $BF_3$ counter which counts the neutrons and a scintillation counter that determines the gamma rays. The scintillation material surrounds the $BF_3$ neutron counter and provides the hydrogenous material that normally surrounds the $BF_3$ neutron counter. Thus, the $BF_3$ counter is sensitive only to the neutrons and the organic or plastic scintillation detector is sensitive to both the neutron and the gamma flux but if the gamma flux is larger than the neutron flux, then most of the scintillation detector response will be to the gamma flux.

It is therefore an object of this invention to provide a simple easily operated radiation detector for simultaneously detecting neutrons and gamma rays.

Another object is to provide a unified radiation detector for detecting neutrons in a large flux of gamma rays.

Other objects and advantages of the invention will hereinafter become more fully apparent from the following description and drawings.

BRIEF DESCRIPTION OF THE DRAWING

The drawing illustrates the relative parts of the radiation detectors.

DESCRIPTION OF THE INVENTION

Now referring to the drawing, there is shown by illustration a radiation detector which is capable of detecting both neutrons and gamma rays. With this device neutrons are detectable in the presence of a large flux of gamma rays. The system includes an elongated block 11 of plastic or organic scintillator material such as polyvinyltoluene which acts as a neutron energy moderator and is well known in the art for detecting gamma rays. The scintillator material block 11 is provided with an axially aligned cavity or cylindrical hole 12 that extends along a portion of the length thereof. A photomultiplier tube 14 is positioned in axial alignment with the end of the block opposite from the cavity 12. The photomultiplier tube is of sufficient size that the photosensitive electrode receives light from approximately the entire area of the end of the scintillator block and suitable electronic circuitry is connected with the photomultiplier tube to record the amount of gamma rays incident on the scintillator block. The axially aligned cavity is sufficient in size and length to receive therein a cylindrical neutron counter 15. The neutron counter is of any suitable type which is well known in the art such as a $BF_3$ neutron counter. Connected with the neutron counter is electronic circuitry which is suitable for recording the signal output of the neutron counter in order to record the presence and amount of neutron flux. The electronic circuitry for each the gamma ray detector and the neutron detector are well known in the art, each including a suitable amplifier and recorder for separately presenting an accurate determination of the mixed neutron gamma field. The electronic circuitry is hot shown for simplification of the drawings.

In operation of the device, gamma rays penetrating the scintillator material produces light photons which are viewed by the photocathode of the photomultiplier tube to produce an output from the photomultiplier tube. The output is measured as is well known in the art. The scintillation material acts as a moderating material for neutrons passing therethrough. The neutrons are then incident on the neutron counter thereby producing an electrical output as is well known in the prior art. Therefore, the scintillating material provides a two-fold duty, scintillations are produced due to incident gamma rays which determines the gamma flux and the scintillation material acts as a moderating material for the neutron detector wherein the neutron detector detects neutrons that passes through the moderator material. Thus, it can be seen that the combination set forth herein detects neutrons in a large field of gamma rays and also provides a gamma ray detector for detecting gamma rays.

The drawing illustrates one gamma ray detector and one neutron detector. It will be obvious that detector-blocks may be stacked to increase the efficiency of the detectors.

Obviously many modifications and variations of the present invention are possible in the light of the above teachings. It is therefore to be understood that within the scope of the appended claims the invention may be practiced otherwise than as specifically described.

I claim:

1. A combination gamma ray detector and neutron detector for detecting gamma rays and neutrons in an intense field of gamma rays which comprises:
    a neutron detector; said neutron detector being a Boron-trifluoride-filled detector,
    a neutron moderator surrounding said neutron detector;
    said neutron moderator consisting of a material that scintillates due to incident gamma ray flux; and
    a scintillation light detector, said scintillation light detector being axially aligned with said neutron detector and said neutron moderator and positioned relative to said neutron moderator in end-to-end relationship for determining gamma ray flux incident on said neutron moderator material.

2. A combination gamma ray detector and neutron detector as claimed in claim 1 wherein said neutron moderator surrounding said neutron detector is coaxial therewith.

3. A combination gamma ray detector and neutron detector as claimed in claim 1 wherein said neutron moderator is any hydrogenous material that scintillates due to incident gamma ray flux.

4. A combination gamma ray detector and neutron detector as claimed in claim 2 wherein said neutron moderator is any hydrogenous material that scintillates due to incident gamma ray flux.